(12) United States Patent
Vanhall

(10) Patent No.: US 7,051,930 B2
(45) Date of Patent: May 30, 2006

(54) BAR CODE FOR MAIL PROCESSING SYSTEMS

(75) Inventor: Richard C. Vanhall, Owego, NY (US)

(73) Assignee: Lockheed Martin Corportion, Bethesda, MD (US)

( * ) Notice: Subject to any disclaimer, the term of this patent is extended or adjusted under 35 U.S.C. 154(b) by 0 days.

(21) Appl. No.: 10/442,416

(22) Filed: May 21, 2003

(65) Prior Publication Data

US 2003/0226894 A1 Dec. 11, 2003

Related U.S. Application Data

(60) Provisional application No. 60/382,305, filed on May 22, 2002.

(51) Int. Cl.
*G06K 7/10* (2006.01)

(52) U.S. Cl. .............................. 235/426.01; 235/426.07; 235/426.08

(58) Field of Classification Search ............. 235/462.1, 235/462.07, 462.08, 462.19, 462.32, 462.16

See application file for complete search history.

(56) References Cited

U.S. PATENT DOCUMENTS

| 4,567,361 A | * | 1/1986 | Rosenthal | 235/462.07 |
| 4,728,784 A | * | 3/1988 | Stewart | 235/462.07 |
| 5,015,832 A | * | 5/1991 | Filipski et al. | 235/462.16 |
| 5,552,591 A | * | 9/1996 | Bossen et al. | 235/462.16 |
| 5,767,498 A | * | 6/1998 | Heske et al. | 235/462.16 |
| 5,777,310 A | * | 7/1998 | Liu et al. | 235/462.12 |
| 5,953,426 A | * | 9/1999 | Windel et al. | 380/51 |
| 6,267,296 B1 | | 7/2001 | Ooshima et al. | |
| 6,321,986 B1 | | 11/2001 | Ackley | |
| 6,761,314 B1 | * | 7/2004 | Schuessler | 235/462.19 |

* cited by examiner

*Primary Examiner*—Steven S. Paik
(74) *Attorney, Agent, or Firm*—Wall Marjama & Bilinski LLP

(57) ABSTRACT

The present invention is directed to a bar code symbol having stored thereon a data structure. The data structure includes a plurality of module elements. Each module element is configured as a bar symbol or a space symbol. The data structure includes a start character containing predetermined number of module elements. The predetermined number of module elements is configured in a predetermined pattern of bars and spaces. A data portion is configured to encode a single numerical value. The data portion has one termination data character and 0 to N Continuation characters, wherein N is an integer value. The data structure also includes a stop character.

16 Claims, 4 Drawing Sheets

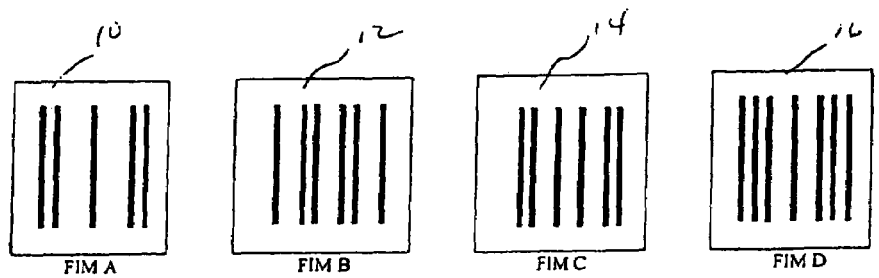
Figure 1A    Figure 1B    Figure 1C    Figure 1D
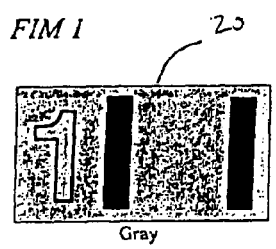 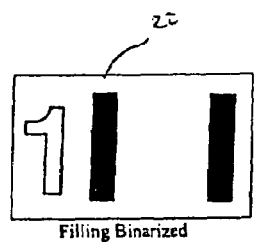 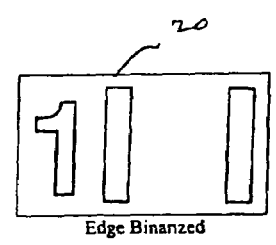
Figure 2A    Figure 2B    Figure 2C
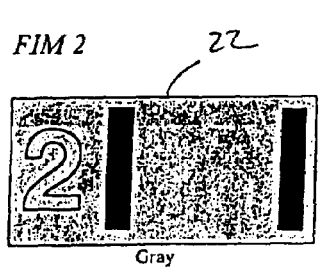 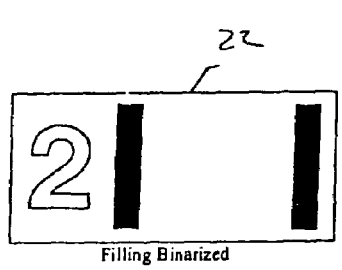 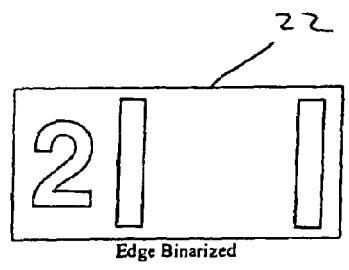
Figure 2D    Figure 2E    Figure 2F

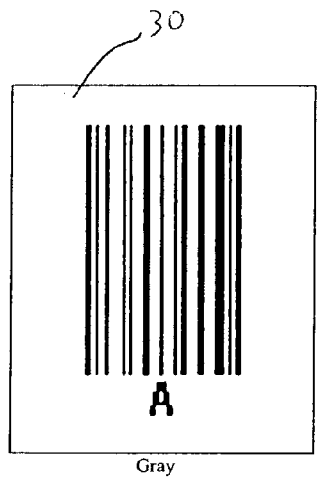 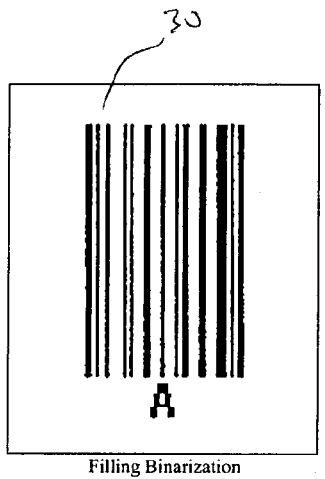 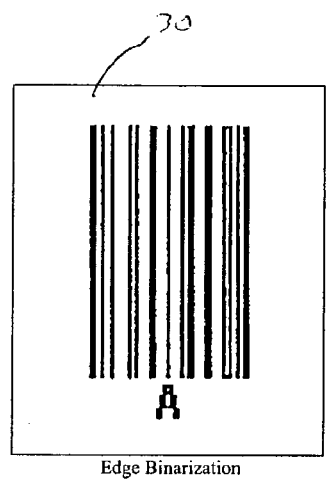
Figure 3A          Figure 3B          Figure 3C
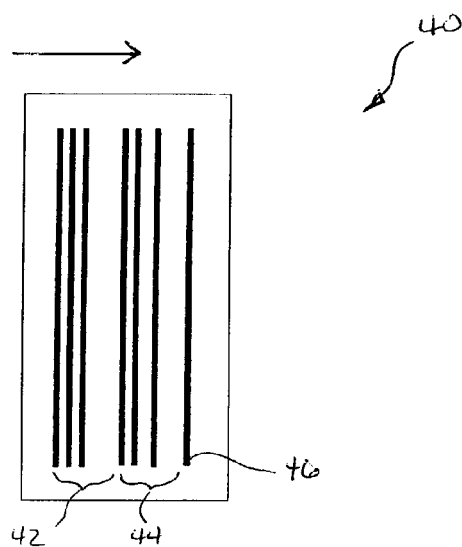
Figure 4

BAR CODE FOR MAIL PROCESSING SYSTEMS

CROSS-REFERENCE TO RELATED APPLICATIONS

This application claims priority under 35 U.S.C. §119(e) based on U.S. Provisional Patent Application Ser. No. 60/382,305, filed May 22, 2002, the contents of which are relied upon and incorporated herein by reference in their entirety.

BACKGROUND OF THE INVENTION

1. Field of the Invention

The present invention relates generally to bar codes, and particularly to bar codes employed in mail processing.

2. Technical Background

In mail processing systems there are many situations in which it is useful to be able to mark mail pieces with machine-readable symbols. These "marks" may represent postal codes, positioning indicators, postage indications, mail bundle types, and many other attributes.

One approach to marking mail pieces, bundles, or other types of mail items includes the use of a symbology known as the Facing Identification Mark (FIM). This mark is simple and conveys no information other than its existence. Referring to FIGS. 1A–1D, diagrams of USPS FIMS are shown. The United States Postal Service uses a set of FIMs for Facing as well as special sortation indicators. They are not particularly suitable for omni direction reading. An interesting point which illustrates the problems about "extending" FIMs is that A, B, and C were designed at the same time, whereas FIM D was added later. Note that if the space and bar sizes are treated loosely enough, which is often the case in order to get good read rates, the reader may confuse certain marks. For example, there is a FIM A within the FIM D (ignore leftmost and rightmost bars).

Referring to FIGS. 2A–2F, UKRM FIM symbol diagrams are shown. The United Kingdom Royal Mail also uses a set of FIMs for facing as well as mail class information. The two examples shown below include a gray scale imaging version, a binarized imaging version that preserves large black areas, and an edge binarized image that does not preserve large black areas. Gray scale imaging produces a good image, but it is more complex and costly. The edge binarization design definitely has issues with wide bars being hollowed out by the imaging system. In order to mitigate this problem, a robust reader is required. Unfortunately, a robust reader is typically more costly, involves increased complexity, and increased reader execution time. FIMs are also not suitable for omni directional reading, but since they are typically used on letters only, this is usually not a problem. It is noted that USPS FIMs do not have hollowing issues because the bar width is uniform and relatively small.

On the other hand, the FIM approach has other drawbacks. Generally, a FIM is a standalone piece of information. This means if FIMs are used to indicate four different things, four different FIMs are required. Thus, the reader software must be programmed to look for each FIM independently. This results in increased reader execution time.

The width/height relationships of some FIMs make it difficult for simple methods of omni-directional detection. Simple scan based detection may fail when the FIM is rotated too far from the axis. In other words, it is not possible to draw a 45 degree line through the entire FIM.

FIMs also have the problem that they are not expandable/extendable in a manner that is transparent to the reading software. For example, if the USPS needed to expand from the four existing FIMs (A, B, C, D) to five, not only would the control programs which act on the FIMs need to be changed, but the underlying FIM reader software would need to be changed as well.

Finally, most FIMs were not designed for image based mail piece processing. While some image based processing equipment uses gray-scale imaging, other types of systems employ bi-level imaging (e.g., black and white) systems such as edge binarization imaging. As discussed above, depending on how these bi-level images are created, large black objects may be hollowed out. Reader software that has the functionality to cope with symbol hollowing is complex. Given the fact that FIMs are used only to convey their existence, the cost-benefit of this complexity is unappealing.

In another approach, linear one dimensional width modulated barcodes have been considered as a means to mark mail items. Some examples of linear bar codes includes interleaved 2 of 5, Code 128, and Code 39. Generally these type of codes are used to hold strings of data from a few characters to the low tens of characters.

Referring to FIGS. 3A–3C, diagrams of Code 128 symbols are shown. The Code 128 barcode shown in these Figures is the symbol for the character "A." FIG. 3A is the gray scale imaging version of the symbol, FIG. 3B is a binarized version of the symbol, and FIG. 3C is the edge binarized version of the symbol. The more complex linear bar codes have some of the same issues described above. Again, the edge binarized symbol is shown as being hollowed out (third bar from the right). It is very difficult for the reader software to overcome this problem due to variable bar size and spacing which Code 128 allows. Barcodes are also subject to image based mail piece processing issues. As explained above, omni-directional detect/decode is an issue with bar codes as well. The narrow bars and spaces need to be wide enough for consistent reading at the resolution the image is being acquired at. Note that this generally causes the wide bars to be susceptible to bi-level hollowing.

Another drawback to using linear bar codes for mail processing relates to the fact that traditional linear width-modulated barcodes are overkill when only a small amount of information needs to be encoded. Most have Start and Stop Characters that may end up needing more space than the data being encoded.

To overcome the problems that the above examples illustrate, what is needed is a barcode that is simpler than traditional linear width modulated barcodes, but more complex than FIMs. In situations when only a small amount of information (perhaps 5 to 10 values) needs to be conveyed, neither FIMs nor existing linear barcodes are optimal. Thus, it is desirable to provide a bar code that can convey small amounts of information, and be edge binarization friendly. The new bar code must also be of a minimum size. It would also be beneficial if the new bar code were expandable, if necessary. The new bar code must be resistant to bar erosion/dilation causing no-reads/misreads. Finally the new bar code must be easy to detect/decode omni-directionally.

SUMMARY OF THE INVENTION

The present invention addresses the aforementioned needs. The bar code of the present invention is optimal for conveying small amounts of data such as a single numerical value between zero (0) and ten (10). At the same time, the bar code is expandable and can be used to encode values greater than ten. The bar code of the present invention is edge binarization friendly, which translates to lower reader complexity and cost.

One aspect of the present invention is a bar code symbol having stored therein a data structure. The data structure includes a plurality of module elements. Each module element is configured as a bar or a space. The data structure includes a start character containing predetermined number of module elements. The predetermined number of module elements is configured in a predetermined pattern of bars and spaces. At least one data character is configured to encode a single numerical value. The at least one data character includes one termination data character and zero (0) to N continuation characters. N is an integer value. The data structure also includes a stop character.

In another aspect, the present invention is directed to a method for processing mail that includes marking at least one piece of mail with a bar code symbol. The bar code symbol includes a start character, at least one data character, and a stop character. The start character contains a predetermined number of module elements. The predetermined number of module elements is configured in a predetermined pattern of bars and spaces. The at least one data character is configured to encode a single numerical value. The at least one data character includes one termination data character and zero (0) to N continuation characters. N is an integer value. The method also includes the step of capturing the bar code symbol with an optical reader. The bar code symbol is converted into electrical signals. The electrical signals are decoded to thereby recover the single numerical value. A mail processing decision is made based on the single numerical value.

In another aspect, the present invention is directed to a computer-readable medium having stored thereon computer-readable instructions for performing a method. The method includes capturing a bar code symbol with an optical indicia reader, whereby the bar code symbol is converted into electrical signals. The bar code symbol includes a start character, at least one data character, and a stop character. The start character contains a predetermined number of module elements. The predetermined number of module elements is configured in a predetermined pattern of bars and spaces. The at least one data character is configured to encode a single numerical value. The at least one data character includes one termination data character and zero (0) to N continuation characters. N is an integer value. The electrical signals are decoded to thereby recover the single numerical value. A mail processing decision is made based on the single numerical value.

In yet another aspect, the present invention is directed to an optical indicia reader for reading a bar code symbol. The reader includes a reader assembly configured to convert the bar code symbol into data. The bar code symbol includes a start character, at least one data character, and a stop character. The start character contains a predetermined number of module elements. The predetermined number of module elements is configured in a predetermined pattern of bars and spaces. The at least one data character is configured to encode a single numerical value. The at least one data character includes one termination data character and zero (0) to N continuation characters. N is an integer value. A processor is coupled to the reader assembly. The processor is programmed to decode the bar code symbol to recover the single numerical value.

In yet another aspect, the present invention is directed to a mail sorting system that includes a labeling device configured to affix a bar code symbol on a mail item. The bar code symbol has a data structure encoded therein. The bar code symbol includes a start character, at least one data character, and a stop character. The start character contains a predetermined number of module elements. The predetermined number of module elements is configured in a predetermined pattern of bars and spaces. The at least one data character is configured to encode a single numerical value. The at least one data character includes one termination data character and zero (0) to N continuation characters. N is an integer value. An optical reader is configured to read the bar code symbol. The bar code symbol is converted into a signal corresponding to the bar code symbol. A processor is coupled to the optical reader. The processor is configured to decode the signal to thereby determine the single numerical value. The processor also is configured to transmit a command corresponding to the single numerical value. A mail sorter is coupled to the processor. The mail sorter is configured to route the mail item in accordance with the command transmitted by the processor.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIGS. 1A–1D are diagrams showing USPS FIM symbols;

FIGS. 2A–2F are diagrams showing UKRM FIM symbols;

FIGS. 3A–3C are diagrams showing Code 128 symbols;

FIG. 4 is an example of a bar code in accordance with one embodiment of the present invention;

DETAILED DESCRIPTION

Figure 5:
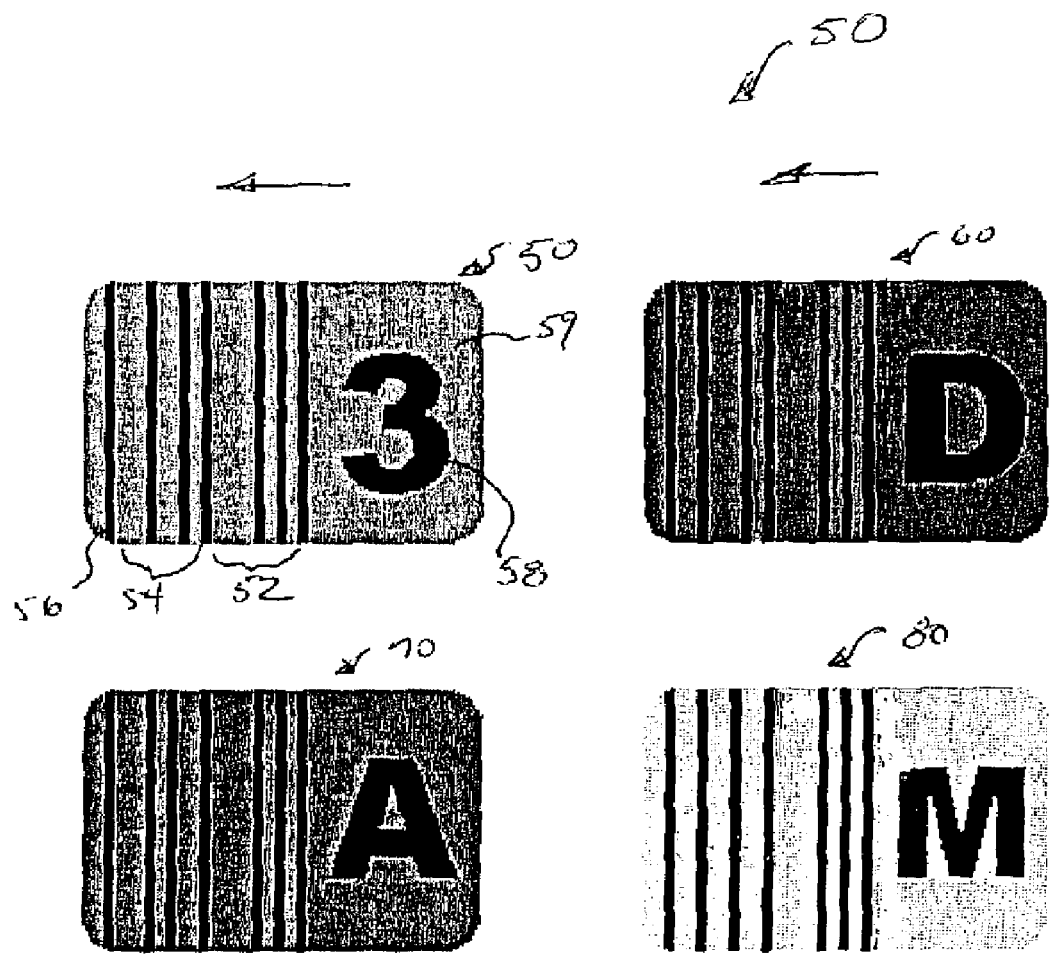
FIG. 5 is an example of another bar code in accordance with a second embodiment of the invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the bar code symbol of the present invention is shown in FIG. 4, and is designated by reference numeral 40.

In accordance with the invention, the present invention is directed to a bar code symbol having a data structure encoded therein. The data structure includes a plurality of module elements. Each module element is configured as a bar or a space. The data structure includes a start character containing a predetermined number of module elements. The predetermined number of module elements is configured in a predetermined pattern of bars and spaces. At least one data character is used to encode a single numerical value. The data character includes one termination data character and an optional (zero (0)–N) continuation character. N is an integer value. The data structure also includes a stop character. Thus, the new barcode described below addresses each of the requirements stated in the Background of the Invention.

The bar code of the present invention is simpler than traditional linear barcodes because it only encodes a single value. On the other hand, it is more complex than FIMs because it indicates more than simple existence. The bar code of the present invention does both. Because there is only one bar width, the width of the bar can be sized so that bi-level hollowing does not occur. For example, the dimensional size of the bar can be chosen so that images with resolutions from 100 to 300 DPI will not cause hollowing (when current binarization and edge binarization algorithms are employed). As opposed to a traditional barcode, the new barcode does not require a multi bar/space stop character. The present invention employs a single stop bar. Further, the barcode character length can be minimized since it has only a few values to represent.

As embodied herein, and depicted in FIG. 4, bar code 40 of the present invention is depicted. Bar code 40 includes start field 42, data character field 44, and stop bar 46. In this embodiment, the bar code is read from left-to-right. Data character field 44 always includes a termination data character. It may also include a continuation character. When the continuation character is used in conjunction with a termination character, the reader is programmed to look for the termination data character and add the value of the continuation character to the value of the termination data character to obtain the single numerical value encoded by the bar code. If the continuation character is used alone, it functions as a termination data character. The range of values that the bar code may encode is expanded by the inclusion of the continuation character. While oftentimes it is not desirable to do this, it is important to have this option available. Note that the reader software would not have to be changed or modified when or if the continuation character is employed.

After the bar width has been selected, the barcode width as a whole can be calculated. Based on the barcode width, the minimum barcode height can be determined so that simple omni-directional reading techniques can be used. In one embodiment, the barcode height is at least twice the barcode width. In another embodiment, the bar width is approximately 0.02".

Table I shows the design of the bar code data structure of the first embodiment of the present invention. The minimal barcode consists of a start character, a termination data character, and a stop character (a single bar). The termination data character should not be confused with the stop bar. The termination character is used to encode the data. Note that a quiet zone of 3–5 bars preceding the Start character is employed in this embodiment. Each character, with the exception of the stop character, consists of 3 bars and 3 spaces. The bars are always 1 module unit wide, while the spaces vary from 1 to 5 module units in width. The stop character is 1 bar.

TABLE I

| Character | Element Widths | | | | | | Element Pattern | | | | | | | | | |
|---|---|---|---|---|---|---|---|---|---|---|---|---|---|---|---|---|
| | B | W | B | W | B | W | 1 | 2 | 3 | 4 | 5 | 6 | 7 | 8 | 9 | 10 |
| Start | 1 | 1 | 1 | 1 | 1 | 5 | | | | | | | | | | |
| Termination 0 | 1 | 1 | 1 | 2 | 1 | 4 | | | | | | | | | | |
| Termination 1 | 1 | 1 | 1 | 3 | 1 | 3 | | | | | | | | | | |
| Termination 2 | 1 | 1 | 1 | 4 | 1 | 2 | | | | | | | | | | |
| Termination 3 | 1 | 2 | 1 | 1 | 1 | 4 | | | | | | | | | | |
| Termination 4 | 1 | 2 | 1 | 2 | 1 | 3 | | | | | | | | | | |
| Termination 5 | 1 | 2 | 1 | 3 | 1 | 2 | | | | | | | | | | |
| Termination 6 | 1 | 2 | 1 | 4 | 1 | 1 | | | | | | | | | | |
| Termination 7 | 1 | 3 | 1 | 1 | 1 | 3 | | | | | | | | | | |
| Termination 8 | 1 | 3 | 1 | 2 | 1 | 2 | | | | | | | | | | |
| Termination 9 | 1 | 3 | 1 | 3 | 1 | 1 | | | | | | | | | | |
| Termination 10 | 1 | 4 | 1 | 1 | 1 | 2 | | | | | | | | | | |
| Continuation (+11) | 1 | 4 | 1 | 2 | 1 | 1 | | | | | | | | | | |
| Stop | 1 | | | | | | | | | | | | | | | |

In the example depicted in FIG. 4, bar code symbol 40 is employed to encode the value of zero (0). As noted above, the bar code is extendable by including the continuation character. In this embodiment, zero (0) to N continuation characters may be employed. Of course, N is an integer value.

The formula for the numerical value encoded by the bar code symbol equals the (Number of Continuation Characters)(11)+(Termination Character Value). Thus, in the example shown in Table I, each continuation character has a value of eleven (11). As shown in Table I, each termination character may have a value between zero (0) and ten (10). Those of ordinary skill in the art will understand that these values may be abbreviated or expanded, depending on the number of bars and spaces employed in the symbol.

Referring back to FIG. 4, from left to right, the barcode consists of a start character. The start character consists of a one (1) module unit wide bar, a one (1) module unit wide space, a one (1) module unit wide bar, a one (1) module unit wide space, a one (1) module unit wide bar, and a five (5) module unit wide space. The termination data character consists of three one (1) module unit wide bars, each separated by a space of variable width. There are two spaces between the three bars, the third space being defined by the space between the third bar of the character and the first bar of the next character, which could be the stop character. In FIG. 4, the first space is a one (1) unit wide space, the second space is a two (2) unit wide space, and the third space is a four (4) unit wide space. Thus, the termination data character is comprised of ten module units. The continuation character is also of the same width. Those of ordinary skill in the art will recognize that the barcode of the present invention may include modifications and variations. Referring to FIG. 5, a bar code in accordance with a second embodiment of the invention is disclosed. In this embodiment, the bar code is read from right-to-left. Further, the start and the termination data character are comprised of only nine module units. This bar code is well suited for use as a pre-sort sticker. For example, bar code 50 includes start character 52, nine (9) module unit wide data character field 54, and stop bar 56. In the example depicted in FIG. 5, the single value encoded is zero (0). Bar code 50 includes additional indicia, such as human readable symbol 58. Reference number 59 refers to the fact that sticker 50 may be color coded.

When the optical reader decodes bar code 50 it obtains the value zero (0), which is the value, or code, corresponding to a three-digit bundle mark presort label. This code tells the mail processing equipment that all of the mail in the bundle should be routed to a mail processing center that corresponds to the first three digits of the zip code. Note also that, in this example, symbol 58 is the number three (3). The three also indicates that the bar code is a three-digit bundle mark presort label. Thus, the numerical value of symbol 50 is associated with the human readable symbol 58.

Referring back to FIG. 5, bar code 60 encodes a numerical value corresponding to a five-digit bundle mark presort label. This code tells the mail processing equipment that all of the mail in the bundle should be routed to a mail processing center corresponding to the zip code on the top mail piece in the bundle. This sticker is also color coded, and the letter "D" indicates that the barcode is a five-digit bundle mark presort label as described immediately above. Bar code 70 is an example of an Automated Distribution Center (ADC) sticker. The encoded value and the letter "A" indicate that the bundle should be routed to the ADC corresponding to the zip code found on the top mail piece in the bundle. Finally, bar code 80 is an example of sticker that indicates that each mail piece in the bundle is unrelated, and is bundled for ease of conveyance.

Figure 6:
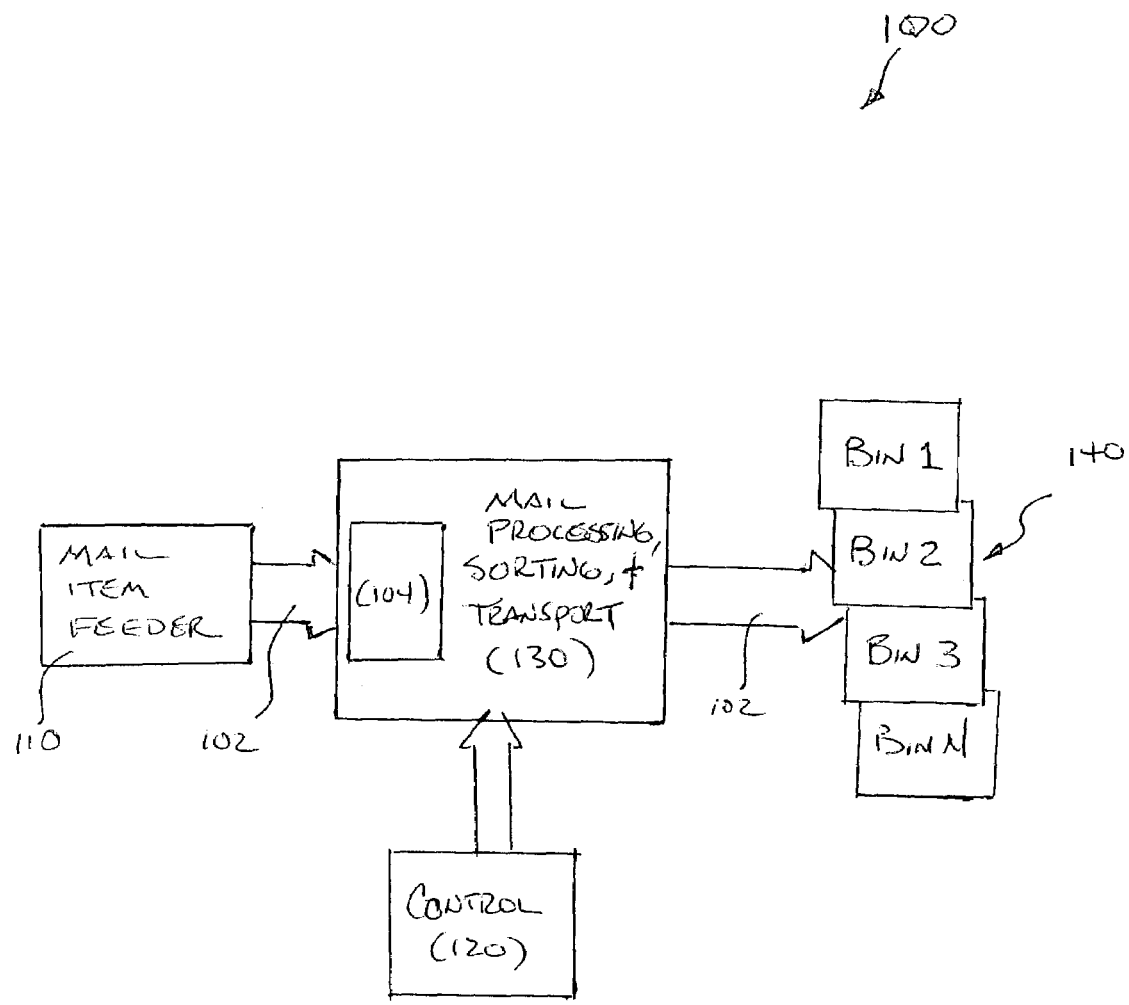
FIG. 6 is a system for processing mail in accordance with the present invention.

As embodied herein, and depicted in FIG. 6, a mail processing system 100 in accordance with the present invention is disclosed. System 100 includes mail item feeder 110 which is configured to introduce mail items into system 100 after a bar code, or bar code sticker, has been affixed thereto. The labeling device that is configured to affix the bar code on the incoming mail items is not shown since it is employed at a point of origination. After a mail piece or a bundle is introduced into system 100, the bar code is read by optical reader assembly 104. Optical reader assembly 104 is coupled to controller 120. Controller 120 is programmed to decode the bar code to thereby obtain the numerical value encoded therein. The numerical value corresponds to a mail processing/sorting option. Examples of sorting options include those discussed above. Controller 120 is configured to transmit a command to mail processing/sorting system 130. The command corresponds to the aforementioned processing/sorting option. Mail processor/sorter 130 routes the mail item or bundle in accordance with the command transmitted by the processor. Subsequently, each mail item or bundle is routed to the appropriate output bin 140.

It will be apparent to those of ordinary skill in the pertinent art that modifications and variations can be made to optical reader assembly 104 of the present invention depending on a variety of factors. However, optical reader 104 is equipped with an illumination assembly, an imaging assembly, memory devices, and other timing and control circuits known to those of ordinary skill in the pertinent art.

Control system 120 typically includes a microprocessor based system coupled to communications interface. Controller may also include a disk/CD-ROM drive, ROM, and RAM, all of which are coupled by a system bus. In another embodiment, system 100 is networked to other mail processing and data processing systems. System 100 may also include a server computer. The server computer may be of any suitable type, such as data server that is employed as repository of all data records generated during the process. In one embodiment, the data server may be equipped with Microsoft Windows™ Server software, any suitable off-the-shelf database software, or custom written software.

It will be apparent to those of ordinary skill in the pertinent art that the processors used to implement controller 120 may be of any suitable type depending on the functionality and sophistication of the firmware resident in ROM. In one embodiment, the processor may include a microprocessor. Controller 120 may also include Application Specific ICs (ASICs), programmable logic gate array devices, or a control processor such as the 80C51 control processor manufactured by Phillips Semiconductors depending on cost and/or other design considerations. Controller 120 may also be implemented as a distributed system. For example, the decoding software may be executed by a processor in the optical reader, whereas other control software is executed elsewhere.

Controller 120 also includes a read/write random access memory (RAM) used in data processing and data I/O. Read only memory (ROM) is configured to store computer programming instructions. ROM 206 may be implemented using a DRAM, ROM, PROM, EPROM, EEPROM, or any other computer readable medium. The control system may also accommodate a disk/CD-ROM drive. The disk/CD-ROM drive may include a hard drive, a floppy diskette drive, and/or a CD-ROM drive. Controller 120 may include a user interface such as a mouse, keyboard, touch pad, and visual display. Further, controller 120 may be equipped with Microsoft Windows™ software, off-the-shelf application software, and custom-written software configured to execute the method of the present invention.

Transmission media include copper wiring, coaxial cables, copper wire and fiber optics. Transmission media can also take the form of acoustic, optical, or electromagnetic waves, such as those generated during radio frequency (RF) and infrared (IR) data communications.

Those of ordinary skill in the art will understand that the methods of the present invention illustrated herein are readily implemented in a computer-readable medium having computer-executable instructions embodied thereon. The computer-readable medium is capable of being loaded and executed on appropriate computer processing device(s) in order to carry out the method or process steps described. The term "computer-readable medium" as used herein refers to any medium that participates in providing instructions to the processors described herein for execution. Such a medium may take many forms, including, but not limited to, non-volatile media, volatile media, and transmission media. Non-volatile media include dynamic memory, such as RAM. Common forms of computer-readable media include, for example, a floppy disk, a flexible disk, hard disk, magnetic tape, any other magnetic medium, a CD-ROM, CDRW, DVD, any other optical medium such as punch cards, paper tape, optical mark sheets, or physical media with patterns of holes or other optically recognizable indicia. Computer-readable media also obviously includes RAM, PROM, EPROM, E²PROM, a FLASH-EPROM, and/or any other memory chip or cartridge, a carrier wave, or any other medium from which a computer can read.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A bar code symbol having encoded thereon an expandable data structure representative of a single numerical value, the expandable data structure comprising:
   a start character including a predetermined number of module elements arranged in a predetermined pattern of bars and spaces, each bar being one module element wide;
   at least one data character configured to encode said single numerical value, the at least one data character including one termination data character and zero (0) to N continuation characters, wherein N is an integer value, the termination data character and each continuation character each including a predetermined number of module elements arranged in a predetermined pattern of bars and spaces, wherein the predetermined pattern includes the same total number of bar symbols and space symbols irrespective of the single numerical value encoded thereupon in which each said bar symbol is defined by a single bar and each space symbol is defined by one or more adjacent spaces and in which each zero (0) to N continuation character immediately precedes the termination data character and represents a predetermined numerical value to be added to the single numerical value of said termination data character in order to selectively expand the single numerical value of said data character; and
   a one module element stop character.

2. The data structure of claim 1, wherein the continuation character also functions as a termination data character when the at least one data character only includes the continuation character.

3. The data structure of claim 1, wherein the data characters includes at least nine module elements.

4. The data structure of claim 3, wherein the at least nine module elements include three bar symbols, each separated by a space symbol.

5. The data structure of claim 4, wherein the single numerical value is defined by the width of the space symbols.

6. The data structure of claim 3, wherein the at least nine module elements includes ten module elements.

7. The data structure of claim 1, wherein the start character includes more contiguous spaces than any data termination character or the continuation character.

8. The data structure of claim 7, wherein the start character includes five contiguous space symbols.

9. The data structure of claim 7, wherein the start character includes three bar symbols.

10. The data structure of claim 1, wherein the stop character includes a single bar symbol.

11. The data structure of claim 1, wherein the bar code symbol includes a human-readable indicia associated with the single numerical value.

12. The data structure of claim 11, wherein the human-readable indicia is an alpha-numeric symbol.

13. The data structure of claim 11, wherein the human-readable indicia is a color.

14. The data structure of claim 1, wherein the single numerical value encoded by said bar code is equal to the value of integer number (N) continuation characters multiplied by the predetermined numerical value of the continuation character plus the numerical value of the single termination character.

15. The data structure of claim 14, wherein the predetermined numerical value of each continuation character is equal to eleven.

16. The data structure of claim 15, wherein each termination character has a numerical value between zero and ten.

* * * * *